No. 846,971. PATENTED MAR. 12, 1907.
N. W. AKIMOFF.
MULTISTAGE TURBO PUMP.
APPLICATION FILED JULY 21, 1906.
2 SHEETS—SHEET 2.
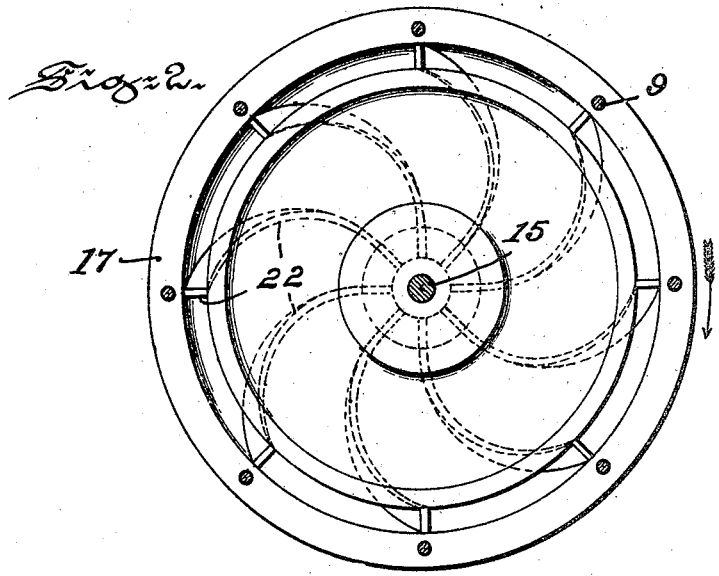
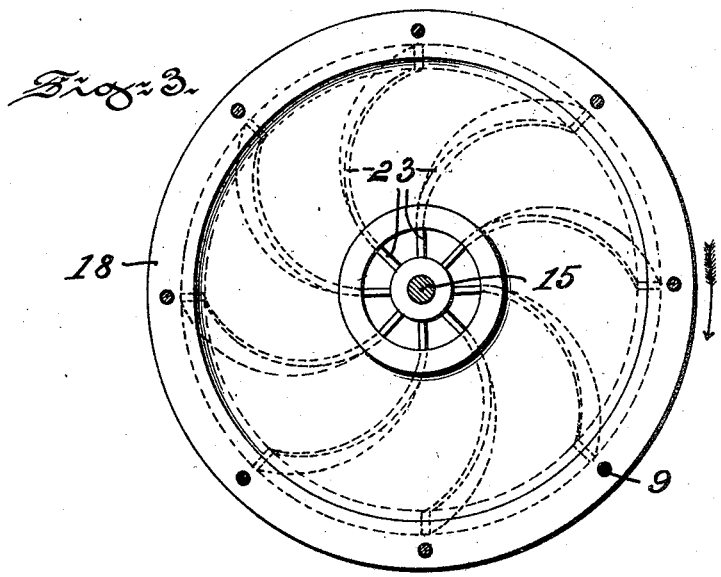
WITNESSES:
Wilhelm Vogt
Thomas M. Smith
INVENTOR
Nicholas W. Akimoff,
BY
J. Walter Douglass.
ATTORNEY.

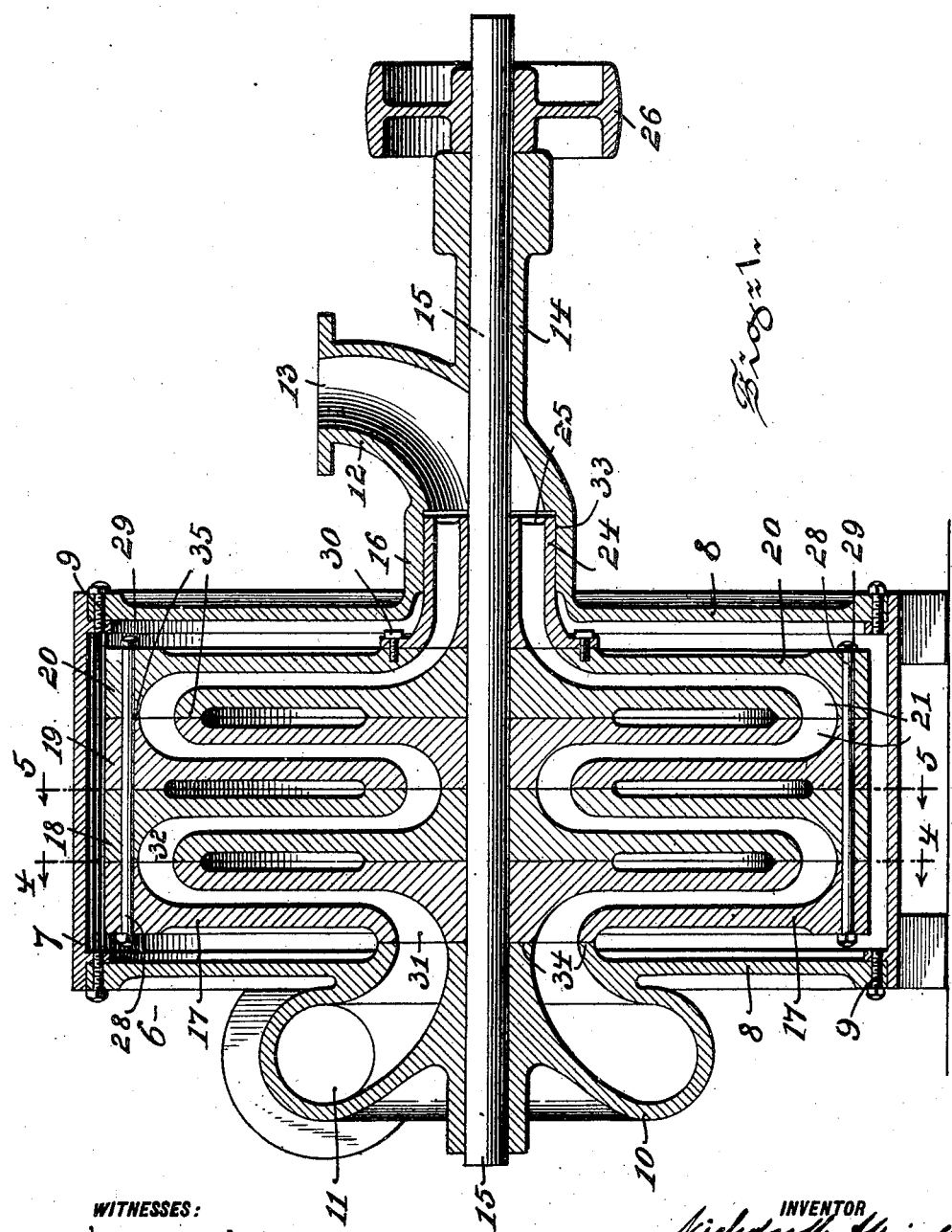

UNITED STATES PATENT OFFICE.

NICHOLAS W. AKIMOFF, OF PHILADELPHIA, PENNSYLVANIA.

MULTISTAGE TURBO-PUMP.

No. 846,971.      Specification of Letters Patent.      Patented March 12, 1907.

Application filed July 21, 1906. Serial No. 327,138.

*To all whom it may concern:*

Be it known that I, NICHOLAS W. AKIMOFF, a subject of the Czar of Russia, but now residing at the city of Philadelphia, in the county of Philadelphia and State of Pennsylvania, have invented certain new and useful Improvements in Multistage Turbo-Pumps, of which the following is a specification.

My invention has relation to a multistage turbo-pump, and in such connection it relates to the general construction and arrangement of such a pump.

The principal objects of my invention are, first, to simplify and increase the efficiency of a multistage turbo-pump by dispensing with the stationary wheels; second, to provide a pump of the character described with a housing and runners rotatably arranged therein; third, to connect the runners with each other to form a solid body, and thereby to permit of rotation of the same in unison and of decreasing the lateral thrust along the shaft; fourth, to shape the runners so as to dispense with packing, and thereby possible leakage between the same; fifth, to shape the stationary housing and runners therein so as to reduce contacting surface to a minimum, to thereby prevent wear and tear, as well as leakage caused by wear, and, sixth, to dispense with a discharge-diffuser on the outer periphery of the wheels by replacing the same with a sleeve which while performing the same function is adapted to reduce the size of the machine, as well as to avoid the working parts being subjected to unbalanced strain or influence of outside diffusers.

The nature and scope of my present invention will be more fully understood from the following description, taken in connection with the accompanying drawings, forming part hereof, in which—

Figure 1 is a view illustrating in central longitudinal section a multistage turbo-pump provided with a stationary housing, and a series of runners connected with each other and rotatably mounted therein so as to terminate in a diffuser-sleeve surrounding the driving-shaft of the pump, all embodying main features of my present invention; and Figs. 2 and 3 are respectively reduced sectional views on lines 4 4 and 5 5 of the runners shown in Fig. 1.

Referring to the drawings, 6 represents a housing, preferably consisting of a substantially annular body 7, forming the standard of the pump, and sides 8, substantially circular in outline, removably connected to the body 7 by bolts or other fastening means 9. One of the sides 8 is provided with a hollow annular extension 10, forming an inlet 11 for fluid into the housing 6, and the other of the sides 7 is provided with a tubular extension 12, forming an outlet 13 for fluid, a bearing 14 for a shaft 15, which is supported at its other end by the extension 10, and a bearing 16 for a purpose to be presently more fully described.

Within the housing 6 and secured to the shaft 15 are arranged a series of runners, in the present instance four runners 17, 18, 19, and 20, each consisting of dish-shaped sections united to each other by curved blades, forming chambers 21 for the passage of fluid therethrough. The shaft 15 and by the same the runners 17, 18, 19, and 20 are rotated by a pulley 26 and a belt (not shown) from any suitable source of power in the direction indicated by the arrows, as shown in Figs. 2 and 3. When the runners are rotated, the blades 22 of the runner 17, owing to their outline, force the fluid entering the inlet-chamber 11 of the housing 6, surrounding the shaft 15 and the chambers 21 of the runner 17, at the point 31 toward the periphery thereof, aided in such action by centrifugal force, while the blades 23 of the adjoining runner 18, owing to their outline, force the fluid entering the same at the point 32 adjacent to its periphery toward the shaft 15, and so on in regular sequence back and forth through the runners 19 and 20 until the fluid by means of the runner 20 is forced into a diffuser formed by a sleeve 24, which surrounds the shaft 15, from which by entering the outlet 13 of the housing 6 it is forced to any point for utilization. (Not shown.)

The diffuser 24 is provided with blades 25 of suitable outline and rotates within the bearing 16 of the housing 6, which latter by affording an extended bearing-surface 33 renders the use of packing material unnecessary at this point, and thereby prevents leakage due to the wear of such material. Moreover, by the arrangement of the diffuser-sleeve 24 adjacent to the shaft 15 the unbalanced strain to which discharge-diffusers located on the outer periphery of one of the wheels of multistage turbo-pumps are subjected is thereby appreciably lessened, avoiding thereby the breakage caused partially by such strain and by the outline of the diffuser.

Leakage of fluid is also prevented at the point of contact 34 of the runner 17 with the side 8 of the housing 6, as the fluid being under no pressure at this point will not pass between the smooth abutting surfaces of the same. At the same time, owing to the provision of extended smooth abutting surfaces 35 between the runners 17, 18, 19, and 20 and the absence of packing, leakage is thereby avoided, thus rendering the pump very efficient and prolonging thereby the usefulness of the same. One mode of rigidly connecting the runners 17, 18, 19, and 20 with each other and holding the same closely together consists of bolts 28 passing therethrough in a manner as shown in Fig. 1, with nuts 29 engaging the bolts 28 and end runners 17 and 20. The runners so connected will form a solid body or unit and when rotated will insure uniformity of motion thereof. The diffuser-sleeve 24, being removably connected with the runner 20 by bolts 30, is rotated in the bearing 16, formed in the housing 6. The portion of the shaft 15 exposed in the outlet 13 may be provided with a sleeve, (not shown,) which protects the same against the action of the fluid passing through the outlet 13. The chambers 21 of the runners 17, 18, 19, and 20 form in a plane transversely of the shaft 15 a circuitous passage-way for fluid, which communicates with the centrally-arranged inlet 11 and outlet 13 of the housing 6. By this arrangement of the respective runners the lateral thrust on the shaft 15 is eliminated, and the slight thrust induced by the exit of fluid from the sleeve 24 into the outlet 13 serves to force the abutting surface 34 of the runners against a similar surface of housing 6, which is sufficient to maintain the joints between the runners and housing fluid-tight.

Having thus described the nature and objects of my invention, what I claim as new, and desire to secure by Letters Patent, is—

1. In a pump of the character described, a housing provided with an inlet and an outlet, a series of runners arranged side by side in the housing, each of said runners having an internal chamber extending from one side to the other to permit in contiguous faces of said runners a direct communication of the chambers with each other, and said runners adapted, when rotated, to suck fluid through the inlet of the housing and discharge the same through the outlet thereof.

2. In a pump of the character described, a housing provided with an inlet and an outlet, a series of runners arranged side by side in the housing, each of said runners having an internal chamber extending from one side to the other to permit in contiguous faces of said runners a direct communication of the chambers with each other, and said runners adapted, when rotated, to suck fluid through the inlet of the housing and discharge the same through the outlet thereof and to confine the fluid within its chambers during passage through said housing.

3. In a pump of the character described, a housing provided with an inlet and an outlet, a series of runners arranged side by side in the housing, each of said runners having an internal chamber terminating at one side near the central portion and at the side opposite thereto near the perimeter thereof to form a circuitous passage-way through said runners by directly communicating with each other in contiguous faces of the runners.

4. In a pump of the character described, a housing provided with an inlet and an outlet, a series of runners arranged side by side in the housing, each of said runners having an internal chamber terminating at one side near the central portion and at the side opposite thereto near the perimeter thereof to form a circuitous passage-way through said runners by directly communicating with each other in contiguous faces of the runners and means for connecting the runners with each other by engaging portions located adjacent to the perimeter thereof.

5. In a pump of the character described, a housing provided with an inlet and an outlet, a series of runners arranged side by side in the housing, each of said runners having an internal chamber extending from one side to the other to permit in contiguous faces of said runners a direct communication of the chambers with each other and blades arranged in each of the chambers of the runners for forcing, when rotated, fluid therethrough.

6. In a pump of the character described, a housing provided with an inlet and an outlet, a series of runners arranged side by side in the housing, each of said runners having an internal chamber extending from one side to the other to permit in contiguous faces of said runners a direct communication of the chambers with each other, blades arranged in each of the chambers of the runners for forcing, when rotated, fluid therethrough, and a diffuser forming a sleeve and connecting the chamber of one of said runners with the outlet of said housing.

7. In a pump of the character described, a stationary housing having a centrally-located inlet and an outlet, a shaft carried by the housing, a series of flat hollow bodies resting side by side and forming connected passage-chambers for fluid connected with the inlet of the housing and terminating radially adjacent to the shaft and periphery of the hollow bodies, blades arranged in the chambers of the bodies for forcing fluid therethrough, a centrally-arranged diffuser forming a sleeve surrounding the shaft and connecting the chambers of the bodies with the outlet of the housing, means for connecting the bodies with each other to form fluid-tight joints between the housing and runners, and means for rotating said shaft and by the same said bodies and diffuser.

8. In a pump of the character described, a stationary housing having a centrally-located inlet and an outlet, a shaft carried by the housing, a series of flat bodies carried by the shaft, each having a chamber forming combined a circuitous passage-way for fluid and communicating with the inlet and the outlet of said housing, and means for connecting said bodies with each other so as to form fluid-tight joints between the same.

9. In a pump of the character described, a stationary housing having a centrally-located inlet and an outlet, a shaft carried by the housing, a series of flat bodies resting side by side and forming a unitary structure carried by said shaft, each of said bodies having a chamber forming combined a circuitous passage-way for fluid connected with the inlet of said housing, blades arranged in each of the chambers of said bodies for forcing when rotated fluid therethrough, a diffuser-sleeve connecting the bodies with said housing and conducting the fluid from the chambers thereof to the outlet, said diffuser-sleeve and the portion of the first of said bodies contacting with said housing adapted to form fluid-tight joints between said housing and bodies, and means for connecting said bodies with each other to form fluid-tight joints between the same.

10. In a pump of the character described, a housing provided with an inlet and an outlet, a shaft carried by said housing, a series of hollow runners mounted on said shaft, each having a chamber forming combined circuitous passage-ways, a sleeve terminating in the outlet of said housing, the passage-ways of said runners adapted to eliminate lateral thrust of the runners on said shaft, and said sleeve adapted in the discharge of said fluid to force said runners at the inlet of said passage-ways against the contacting surface of said housing.

In witness whereof I have hereunto affixed my signature in the presence of two subscribing witnesses.

NICHOLAS W. AKIMOFF.

Witnesses:
  GEO. W. REED,
  THOMAS M. SMITH.